United States Patent
Chaitanya et al.

(10) Patent No.: US 12,524,912 B1
(45) Date of Patent: Jan. 13, 2026

(54) FUSION AND SUPER-RESOLUTION OF MONOCHROME AND COLOR IMAGES USING DEEP NEURAL NETWORKS

(71) Applicant: META PLATFORMS TECHNOLOGIES, LLC, Menlo Park, CA (US)

(72) Inventors: Chakravarty Reddy Alla Chaitanya, Kirkland, WA (US); Yuchen Fan, San Jose, CA (US); Rakesh Ranjan, Mountain View, CA (US); Gabriel Molina, Sunnyvale, CA (US); Lele Wang, Los Altos, CA (US); Vikas Chandra, Fremont, CA (US); Ingrid Anda Cotoros, Hillsborough, CA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 578 days.

(21) Appl. No.: 18/049,894

(22) Filed: Oct. 26, 2022

(51) Int. Cl.
*G06T 7/90* (2017.01)
*G06T 3/4053* (2024.01)
*G06T 9/00* (2006.01)
*G06V 10/771* (2022.01)
*G06V 10/82* (2022.01)

(52) U.S. Cl.
CPC .............. *G06T 7/90* (2017.01); *G06T 3/4053* (2013.01); *G06T 9/00* (2013.01); *G06V 10/771* (2022.01); *G06V 10/82* (2022.01); *G06T 2207/10024* (2013.01); *G06T 2207/20081* (2013.01)

(58) Field of Classification Search
CPC ......... G06T 5/00–94; G06T 7/33; G06T 7/90; G06T 3/4053; G06T 9/00; G06T 2207/10024; G06T 2207/20081; G06V 10/771; G06V 10/82
See application file for complete search history.

(56) References Cited

U.S. PATENT DOCUMENTS

| 9,654,700 | B2 | 5/2017 | Kovtun et al. |
| 9,904,871 | B2 | 2/2018 | Merhav et al. |
| 11,252,345 | B2 | 2/2022 | Sun et al. |

(Continued)

OTHER PUBLICATIONS

Jang "Deep Color Transfer for Color-Plus-Mono Dual Cameras" MDPI May 2020 (Year: 2020).*

(Continued)

*Primary Examiner* — Sean T Motsinger
(74) *Attorney, Agent, or Firm* — Freestone Intellectual Property Law PLLC; Aaron J. Visbeek

(57) ABSTRACT

One embodiment of the present invention sets forth a technique for combining a color image and a monochrome image. The technique includes inputting a first set of pixel values from the color image and a second set of pixel values from the monochrome image into a neural network. The technique also includes applying, via a first set of neural network layers, one or more downsampling operations and one or more upsampling operations to feature maps associated with the inputted pixel values to generate a first output image that includes a first set of color values for a first set of pixel locations in the monochrome image. The technique further includes applying a second set of neural network layers to the first set of color values to generate a second output image that includes a second set of color values that is larger than the first set of color values.

18 Claims, 8 Drawing Sheets

(56) References Cited

U.S. PATENT DOCUMENTS

| | | | | |
|---|---|---|---|---|
| 2010/0073499 | A1* | 3/2010 | Gere | H04N 23/15 |
| | | | | 348/222.1 |
| 2015/0078678 | A1* | 3/2015 | Grandin | H04N 23/45 |
| | | | | 382/284 |
| 2018/0041742 | A1* | 2/2018 | Stetson | H04N 23/841 |
| 2019/0361501 | A1* | 11/2019 | Park | H04N 23/45 |
| 2020/0349711 | A1 | 11/2020 | Duke et al. | |
| 2021/0037187 | A1* | 2/2021 | Stern | H04N 23/957 |
| 2021/0357726 | A1 | 11/2021 | Li et al. | |
| 2022/0020178 | A1* | 1/2022 | Metzler | G06T 5/60 |
| 2022/0051441 | A1* | 2/2022 | Zahnert | G06T 7/85 |
| 2022/0398693 | A1* | 12/2022 | Sasagawa | G06T 5/00 |
| 2023/0186437 | A1* | 6/2023 | Balatzis | G06T 5/60 |
| | | | | 382/154 |
| 2024/0062425 | A1* | 2/2024 | Herold | G06T 7/74 |
| 2024/0119672 | A1* | 4/2024 | Chaurasia | H04N 13/271 |
| 2025/0039560 | A1* | 1/2025 | Martin | G06T 5/50 |
| 2025/0067857 | A1* | 2/2025 | Couture | G01S 17/931 |

OTHER PUBLICATIONS

Dong et al. "Shoot high-quality color images using dual-lens system with monochrome and color cameras" Elviser 2019 (Year: 2019).*

Ronneberger O., et al., "U-Net: Convolutional Networks for Biomedical Image Segmentation," International Conference on Medical Image Computing and Computer-Assisted Intervention, May 18, 2015, 8 Pages.

* cited by examiner

FUSION AND SUPER-RESOLUTION OF MONOCHROME AND COLOR IMAGES USING DEEP NEURAL NETWORKS

BACKGROUND

Field of the Various Embodiments

Embodiments of the present disclosure relate generally to machine learning and computer vision and, more specifically, to fusion and super-resolution of monochrome and color images using deep neural networks.

Description of the Related Art

Wearable devices such as virtual reality (VR), augmented reality (AR), and/or mixed reality (MR) headsets commonly include cameras that capture the physical space around a user. For example, a wearable device could include one or more camera sensors that capture light from the environment surrounding a user. Pixel values from the camera sensor(s) could then be combined with AR content, VR content, or other generated content into images or video that is outputted by a display on the wearable device to the user.

However, camera sensors on wearable devices tend to be smaller and lower in resolution than camera sensors on digital cameras and other types of electronic devices. For example, a camera sensor in an AR or VR headset could include millions of pixels, while a camera sensor in a mobile phone or digital camera could include tens of millions of pixels. The camera sensor on the AR or VR headset would additionally include smaller pixels than the camera sensor in the mobile phone or digital camera.

Further, the smaller sensor resolutions and pixel sizes on wearable devices can negatively impact the quality of images produced by cameras on the wearable devices. More specifically, the smaller pixel size in the camera sensor of a wearable device causes the camera sensor to be less sensitive to light and more susceptible to noise. Under low light conditions, the signal to noise ratio (SNR) of a given pixel in the camera sensor drops further, resulting in an even greater loss of visual details. When color filters are placed over photosites in the camera sensor to allow the camera sensor to capture color images (e.g., by measuring red, green, and blue (RGB) color values from the environment), the sensitivity of the camera sensor is further reduced because each color filter lets in only a fraction of available light to the corresponding photosite. At the same time, the smaller number of pixels in the camera sensor reduces the spatial resolution of images produced by the camera sensor.

As the foregoing illustrates, what is needed in the art are more effective techniques for capturing images using camera sensors on wearable devices.

SUMMARY

One embodiment of the present invention sets forth a technique for combining a color image and a monochrome image. The technique includes inputting a first set of pixel values from the color image and a second set of pixel values from the monochrome image into a neural network. The technique also includes applying, via a first set of neural network layers included in the neural network, one or more downsampling operations and one or more upsampling operations to feature maps associated with the first set of pixel values and the second set of pixel values to generate a first output image, where the first output image includes a first set of color values for a first set of pixel locations in the monochrome image. The technique further includes applying a second set of neural network layers included in the neural network to the first set of color values to generate a second output image that includes a second set of color values, where the second set of color values is larger than the first set of color values.

One technical advantage of the disclosed techniques relative to the prior art is that the output image combines visual details captured by the monochrome sensor with color information captured by the color sensor. Accordingly, the disclosed techniques provide better low light performance and image quality than conventional techniques that generate color images using only color sensors with the same pixel size. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skill in the art that the inventive concepts may be practiced without one or more of these specific details.

Overview

As discussed above, camera sensors on AR, VR, and other types of wearable devices tend to be lower in resolution and have smaller pixels than camera sensors on mobile phones or digital cameras. These smaller sensors and pixel sizes can negatively impact the quality of images captured by the wearable devices, particularly under low light conditions.

To address these issues, the disclosed embodiments use a deep neural network to fuse a monochrome image captured by a monochrome sensor and a color image captured by an RGB sensor (or another type of camera sensor that captures polychromatic pixel values). The monochrome sensor and RGB sensor capture the monochrome image and color image, respectively, from slightly different viewpoints. For example, the monochrome sensor and RGB sensor could be placed side by side in a camera. To correct for the differences in viewpoints, an optical flow estimation technique, image registration technique, and/or image rectification technique is used to align the pixels across the two images. The aligned pixels are also inputted into the deep neural network.

The deep neural network includes a U-Net architecture that performs gradual downsampling of feature maps associated with the input, followed by gradual upsampling of the feature maps. The deep neural network also includes skip connections between outputs of the downsampling layers and corresponding upsampling layers at the same resolution. The output of the deep neural network includes a full color image of the scene that combines visual details from the monochrome image with color information from the color image. The deep neural network can also include one or more layers that perform supersampling of pixel values in the full color image to generate an output image that is higher in resolution than the monochrome image and/or color image inputted into the deep neural network.

System Overview

Figure 1:
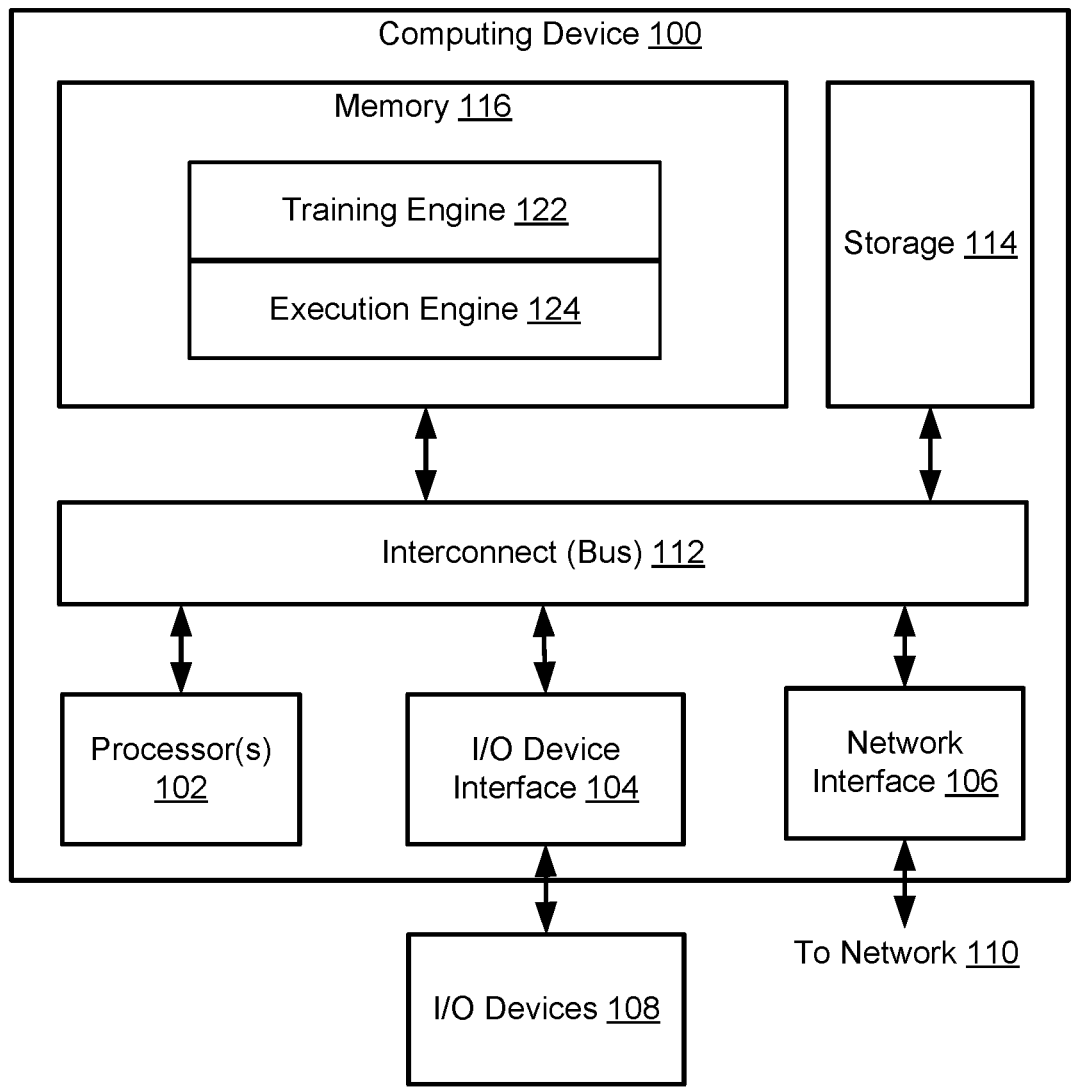
FIG. 1 illustrates a system configured to implement one or more aspects of various embodiments.

FIG. 1 illustrates a computing device 100 configured to implement one or more aspects of various embodiments. In one embodiment, computing device 100 may be a desktop computer, a laptop computer, a smart phone, a personal digital assistant (PDA), a tablet computer, a server, or any other type of computing device configured to receive input, process data, and optionally display images, and is suitable for practicing one or more embodiments. Computing device 100 is configured to run a training engine 122 and an execution engine 124 that reside in a memory 116.

It is noted that the computing device described herein is illustrative and that any other technically feasible configurations fall within the scope of the present disclosure. For example, multiple instances of training engine 122 and execution engine 124 could execute on a set of nodes in a distributed system to implement the functionality of computing device 100.

In one embodiment, computing device 100 includes, without limitation, an interconnect (bus) 112 that connects one or more processors 102, an input/output (I/O) device interface 104 coupled to one or more input/output (I/O) devices 108, memory 116, a storage 114, and a network interface 106. Processor(s) 102 may be any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processor(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing instance executing within a computing cloud.

I/O devices 108 include devices capable of providing input, such as a keyboard, a mouse, a touch-sensitive screen, and so forth, as well as devices capable of providing output, such as a display device. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

Network 110 is any technically feasible type of communications network that allows data to be exchanged between computing device 100 and external entities or devices, such as a web server or another networked computing device. For example, network 110 may include a wide area network (WAN), a local area network (LAN), a wireless (Wi-Fi) network, and/or the Internet, among others.

Storage 114 includes non-volatile storage for applications and data, and may include fixed or removable disk drives, flash memory devices, and CD-ROM, DVD-ROM, Blu-Ray, HD-DVD, or other magnetic, optical, or solid-state storage devices. Training engine 122 and execution engine 124 may be stored in storage 114 and loaded into memory 116 when executed.

Memory 116 includes a random-access memory (RAM) module, a flash memory unit, or any other type of memory unit or combination thereof. Processor(s) 102, I/O device interface 104, and network interface 106 are configured to read data from and write data to memory 116. Memory 116 includes various software programs that can be executed by processor(s) 102 and application data associated with said software programs, including training engine 122 and execution engine 124.

In some embodiments, training engine 122 trains a machine learning model to combine a first set of pixel values from a color image with a second set of pixel values from a monochrome image into an output image. More specifically, training engine 122 trains a deep neural network to predict color pixel values for some or all pixel locations in the monochrome image and/or color image, given a set of luminance values from the monochrome image and a set of color values from the color image. For example, the deep neural network could be trained to predict RGB pixel values for all pixel locations in the monochrome image based on luminance values for the pixel locations from the monochrome image and color values from an RGB image of the same size and/or a smaller RGB image.

Execution engine 124 executes the trained machine learning model to combine additional pairs of monochrome images and color images. Each pair of images is captured simultaneously by a monochrome sensor and an RGB sensor. To correct for differences in viewpoints between the monochrome sensor and the RGB sensor, pixel values in the pair of images are aligned using an optical flow estimation technique. The aligned pixel values are inputted into the trained machine learning model, and the machine learning model converts the input into a full color image that combines visual details captured in the monochrome image with color information from the color image.

Fusion of Monochrome and Color Images Using Deep Neural Networks

Figure 2:
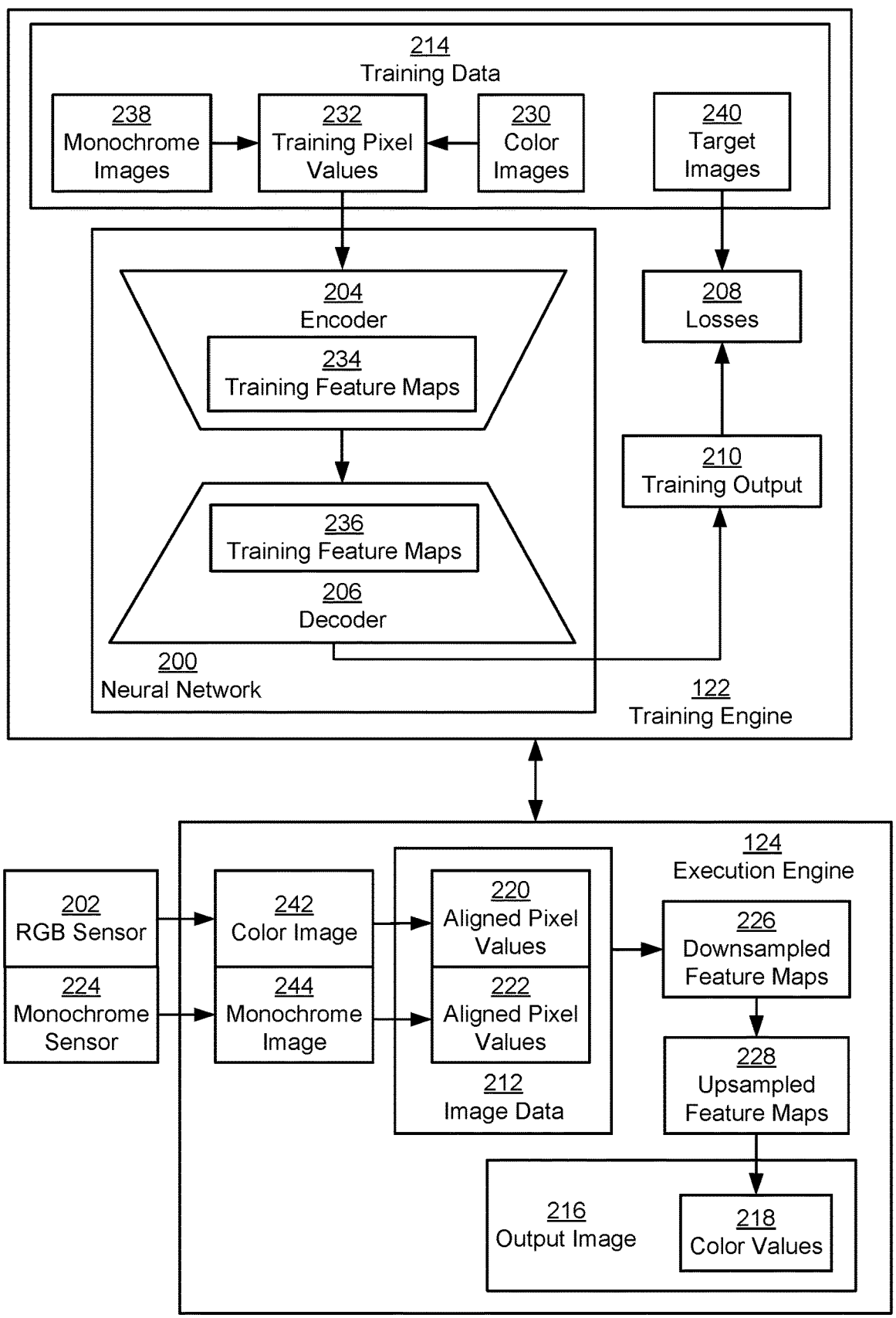
FIG. 2 is a more detailed illustration of the training engine and execution engine of FIG. 1, according to various embodiments.

FIG. 2 is a more detailed illustration of training engine 122 and execution engine 124 of FIG. 1, according to various embodiments. As mentioned above, training engine 122 and execution engine 124 operate to train and execute a neural network 200 to perform fusion of monochrome and color images. For example, training engine 122 and execution engine 124 could train neural network 200 to combine luminance values from a monochrome image 244 with color values from a color image into 242 a single output image 216.

As shown in FIG. 2, input into neural network 200 includes image data 212 associated with color image 242 captured by an RGB sensor 202 (or another type of polychromatic camera sensor) and monochrome image 244 captured by a monochrome sensor 224. Color image 242 includes a set of polychromatic color values for a set of pixel locations on RGB sensor 202. For example, RGB sensor 202 could include a Bayer filter and/or another type of color filter array that is arranged over a grid of photosites. The color filter array includes different types of color filters arranged in a pattern, which allows each photosite to measure a single red, green, blue, and/or other color value for a corresponding pixel location. A demoisaicing technique could be used to reconstruct a full color image 242 that includes three or more color values (e.g., a set of RGB values) for each pixel location from the single color value measured by each photosite in RGB sensor 202.

Monochrome image 244 includes a set of luminance values for a set of pixel locations on monochrome sensor 224. For example, monochrome sensor 224 could include transparent color filters arranged over a grid of photosites. The transparent color filters allow the photosites to detect greater levels of light than the photosites in RGB sensor 202 without distinguishing between different colors in the detected light.

In one or more embodiments, color image 242 and monochrome image 244 are captured simultaneously from slightly different viewpoints by RGB sensor 202 and monochrome sensor 224. For example, RGB sensor 202 and monochrome sensor 224 could be arranged in a horizontal row, in a vertical column, and/or according to another layout that causes objects or features to appear in slightly different locations within color image 242 and monochrome image 244.

Figure 3B:
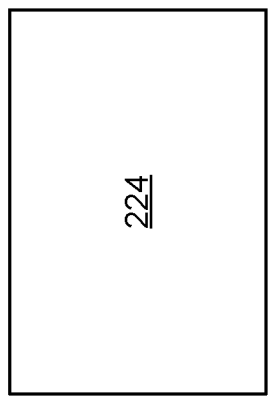
FIG. 3B illustrates an exemplar layout for the RGB sensor and monochrome sensor of FIG. 2, according to various embodiments.
Figure 3A:
FIG. 3A illustrates an exemplar layout for the RGB sensor and monochrome sensor of FIG. 2, according to various embodiments.

FIG. 3A illustrates an exemplar layout for RGB sensor 202 and monochrome sensor 224 of FIG. 2, according to various embodiments. As shown in FIG. 3A, RGB sensor 202 and monochrome sensor 224 are arranged side by side in a horizontal row. RGB sensor 202 and monochrome sensor 224 are also of the same size and/or resolution.

FIG. 3B illustrates an exemplar layout for RGB sensor 202 and monochrome sensor 224 of FIG. 2, according to various embodiments. As shown in FIG. 3B, RGB sensor 202 and monochrome sensor 224 are arranged side by side in a horizontal row, but monochrome sensor 224 is large than RGB sensor 202. Thus, in the layout of FIG. 3B, monochrome sensor 224 is capable of capturing higher resolution images than RGB sensor 202.

While the layouts of FIGS. 3A-3B include side-by-side arrangements of RGB sensor 202 and monochrome sensor 224, it will be appreciated that other arrangements and/or variations of RGB sensor 202 and monochrome sensor 224 can be used with the disclosed techniques. For example, RGB sensor 202 and monochrome sensor 224 could be arranged in a column, stacked on top of one another, angled toward or away from one another, and/or rotated with respect to one another. In another example, RGB sensor 202 and monochrome sensor 224 could include different pixel sizes and/or numbers of pixels. In a third example, RGB sensor 202 and/or monochrome sensor 224 could be replaced and/or used with other types of camera sensors, such as (but not limited to) RGBW sensors, infrared sensors, and/or sensors with other types of color filter arrays (e.g., RGBE, RYYB, CYYM, CYGM, etc.).

Returning to the discussion of FIG. 2, image data 212 includes aligned pixel values 220 from color image 242 and aligned pixel values 222 from monochrome image 244. In one or more embodiments, aligned pixel values 220-222 are generated by aligning the viewpoints of RGB sensor 202 and monochrome sensor 224, so that a given object or feature appears at the same location in both sets of aligned pixel values 220-222. For example, a Lucas-Kanade, Horn-Schunk, and/or another type of optical flow estimation technique could be applied to color image 242 and monochrome image 244 to determine motion vectors between the two images. The motion vectors could be applied to pixel values in one of the images to align the pixel values with those of the other image. In another example, an image registration and/or image rectification technique could be used to project color image 242 onto monochrome image 244 and/or generate two sets of aligned pixel values 220-222 that fall on the same image plane.

In some embodiments, neural network 200 includes a U-Net architecture. The U-Net architecture includes a convolutional encoder 204 that generates downsampled feature maps 226 from image data 212. The U-Net architecture also includes a decoder 206 that generates upsampled feature maps 228 from downsampled feature maps 226. The U-Net architecture further includes skip connections that connect various layers of encoder 204 with corresponding layers of decoder 206 associated with the same feature map resolution.

For example, encoder 204 could include a series of encoder blocks that generate increasingly downsampled feature maps 226 from image data 212. Each encoder block could perform downsampling of image data 212 or an input feature map from a previous encoder block using two 3×3 convolutions, a rectified linear unit (ReLU) activation function after each 3×3 convolution, and a 2×2 max pooling operation with stride 2. The encoder block outputs a feature map that has a lower spatial resolution and a larger number of channels than the input feature map. Decoder 206 could include a series of decoder blocks that generate increasingly upsampled feature maps 228 from downsampled feature maps 226. Each decoder block could perform upsampling of an input feature map from the last encoder block or a previous decoder block using a 2×2 up-convolution that maps each pixel vector in the input feature map to a 2×2 pixel window, a concatenation of the upsampled feature map with a corresponding feature map of the same resolution from encoder 204, two 3×3 convolutions, and a ReLU activation function after each 3×3 convolution.

The output of the last layer in decoder 206 includes an output image 216 with color values 218 for some or all pixel locations in monochrome image 244. For example, output image 216 could include three channels that specify red, green, and blue values (or color values associated with another color model) for each pixel location in monochrome image 244 and/or pixel locations that fall within a crop of monochrome image 244. Visual details in output image 216 could be provided by luminance values from monochrome image 244, and colors in output image 216 could be provided by color values in color image 242.

In some embodiments, neural network 200 includes one or more additional layers that increase the resolution of output image 216 by performing supersampling of color values 218 outputted by the last layer of decoder 206. For example, these additional layers could include convolutional kernels, pixel shuffle layers, and/or other components that convert color values 218 for a given output image 216 that is X pixels wide by Y pixels high into another output image 216 that is A*X pixels wide by B*Y pixels high, where A and B are both greater than 1.

In one or more embodiments, neural network 200 is adapted for use with a particular resolution and/or configuration associated with RGB sensor 202 and/or monochrome sensor 224. For example, a given version of neural network 200 could be trained and/or executed to generate output image 216 from input image data 212 that includes a certain ratio of resolutions between monochrome image 244 and color image 242. A given version of neural network 200 could also, or instead, be trained and/or executed to generate output image 216 from input image data 212 that is derived from a certain configuration or layout of RGB sensor 202 and monochrome sensor 224.

Training engine 122 trains neural network 200 using training data 214 that includes training pixel values 232 from a set of color images 230 and a corresponding set of monochrome images 238. In one or more embodiments, training pixel values 232 include luminance values from monochrome images 238 and color values from color images 230 that are derived or synthesized from a set of "ground truth" target images 240. For example, target images 240 could include high-resolution RGB (or other types of color) images that are captured by a camera and/or included in one or more image datasets. Training engine 122 could use an imaging simulation technique to convert each high-resolution RGB image into a lower-resolution monochrome image and a lower-resolution color image. This conversion could additionally be performed so that the lower-resolution color image and lower-resolution monochrome image are synthesized to reflect the viewpoints of RGB sensor 202 and monochrome sensor 224, respectively, in a certain configuration or layout.

Training data 214 can also, or instead, include triplets of "real world" monochrome images 238, color images 230, and target images 240 that are captured by multiple camera sensors at the same time. For example, a beam splitter could be used to direct one portion of light from a scene to a high-resolution color sensor and another portion of light from the scene to RGB sensor 202 and monochrome sensor 224 arranged in a certain layout. The high-resolution color sensor would capture a high-resolution target image of the scene, RGB sensor 202 would capture a lower resolution color image of the scene, and monochrome sensor 224 would capture a monochrome image of the scene at the same resolution as and/or at a higher resolution than the color image captured by RGB sensor 202.

After training data 214 is collected, generated, and/or synthesized, training engine 122 generates training pixel values 232 for each monochrome image-RGB image pair in training data 214. For example, training engine 122 could use an optical flow estimation technique, image registration technique, and/or image rectification technique to generate training pixel values 232 that include a first set of pixel values from the monochrome image and a second set of pixel values from the RGB image. The first and second sets of pixel values would be arranged so that a given object or feature appears at the same pixel location in both sets of pixel values.

After training pixel values 232 are determined for a batch of color images 230 and corresponding monochrome images 238, training engine 122 inputs training pixel values 232 into encoder 204 and uses a series of encoder blocks in encoder 204 to generate multiple sets of increasingly downsampled training feature maps 234 from pixel values 232. For example, training engine 122 could input a multi-channel image that includes monochrome training pixel values 232 from a given monochrome image and red, green, and blue training pixel values 232 from a corresponding color image into encoder 204. Training engine 122 also inputs some or all training feature maps 234 from encoder 204 into a series of decoder blocks in decoder 206 and uses the decoder blocks to generate multiple sets of increasingly upsampled training feature maps 236.

For each set of training pixel values 232 inputted into neural network 200, training engine 122 obtains training output 210 that includes a corresponding output image 216. As mentioned above, output image 216 can be the same resolution as a subset of training pixel values 232 for a corresponding monochrome image inputted into neural network. Output image 216 can also, or instead, be supersampled to be at a higher resolution than training pixel values 232 for the corresponding monochrome image.

Training engine 122 also computes one or more losses 208 between training output 210 and a corresponding target image associated with training pixel values 232. Training engine 122 then updates parameters of encoder 204, decoder 206, and/or any supersampling layers used to generate training output 210 in a way that minimizes losses 208.

For example, training engine 122 could compute an L1 loss, L2 loss, and/or another measurement of error between RGB pixel values in training output 210 and the corresponding ground truth pixel values in target images 240. When training output 210 is lower in resolution than target images 240, training engine 122 could compute losses 208 between pixel values in training output 210 and a subset of pixel values in target images 240 that correspond to the locations of the pixel values in training output 210. Training engine 122 could also use a training technique (e.g., gradient descent and backpropagation) to iteratively update weights of encoder 204 and decoder 206 in a way that reduces subsequent losses 208 between training output 210 and ground truth pixel values in the corresponding color images 230.

In one or more embodiments, training engine 122 trains neural network 200 using fixed size "patches" of training pixel values 232 from color images 230 and monochrome images 238. For example, training engine 122 could divide each of color images 230 and the corresponding monochrome images 238 into 256×256 patches and generate training pixel values 232 for each patch. Training engine 122 could use encoder 204 and decoder 206 to generate training feature maps 234-236 and a training output 210 for each patch. Training engine 122 could then compute losses 208 between the training output 210 and a corresponding target image patch and update parameters of encoder 204 and decoder 206 based on losses 208.

In some embodiments, training engine 122 trains neural network 200 in two training stages. During the first training stage, training engine 122 inputs training pixel values 232 from synthetic monochrome images 238 and synthetic color images 230 into neural network 200. Training engine 122 also updates parameters of neural network 200 based on losses 208 between training output 210 generated by neural network from the inputted training pixel values 232 and corresponding target images 240 from which the synthetic monochrome images 238 and synthetic color images 230 were derived. During the second training stage, training engine 122 inputs training pixel values 232 from monochrome images 238 and color images 230 that are captured by monochrome sensors and RGB sensors, respectively, into neural network 200. Training engine 122 also updates parameters of neural network 200 based on losses 208 between training output 210 generated by neural network from the inputted training pixel values 232 and target images 240 captured by high-resolution camera sensors at the same time as the corresponding monochrome images 238 and color images 230. Training engine 122 can also repeat one or both training stages until training of neural network is complete.

After training of neural network 200 is complete, execution engine 124 uses the trained neural network 200 to perform fusion of color images and monochrome images that are not included in training data 214 for neural network 200. For example, execution engine 124 could obtain a given color image 242 from RGB sensor 202 and a corresponding monochrome image 244 from monochrome sensor 224. Execution engine 124 could use an optical flow estimation technique, image registration technique, and/or image alignment technique to generate aligned pixel values 220 from color image 242 and/or aligned pixel values 222 from monochrome image 244. Execution engine 124 could input aligned pixel values 220-222 as a multi-channel image, two separate images, and/or another representation of image data 212 into encoder 204. Execution engine 124 could use a series of encoder blocks in encoder 204 to generate multiple sets of downsampled feature maps 226 from the inputted image data 212. Execution engine 124 could also use a series of decoder blocks in decoder 206 to generate multiple sets of upsampled feature maps 228 associated with image data 212. Execution engine 124 could then obtain an output image 216 that includes color values 218 for some or all pixel locations in monochrome image 244 from the last layer of decoder 206. When neural network 200 is used to perform supersampling associated with monochrome image 244 and/or color image 242, execution engine 124 could additionally use one or more convolutional layers, pixel shuffle layers, and/or other types of neural network layers to upsample color values 218 from the last layer of decoder 206 into a larger set of color values 218, thereby generating output image 216 with a higher resolution than monochrome image 244 and/or color image 242.

As mentioned above, training engine 122 and execution engine 124 include functionality to train and execute a different neural network 200 for each arrangement and/or combination of a given RGB sensor 202, and a given monochrome sensor 224. Training engine 122 and execution engine 124 can similarly be configured to train and execute different versions of neural network 200 to accommodate different types of input and/or different ways in which the input can be processed.

First, neural network 200 can include one or more components that learn to correct for differences in viewpoint between RGB sensor 202 and monochrome sensor 224, in lieu of or in addition to inputting aligned pixel values 220-222 into neural network 200. For example, neural network 200 could include a first set of branches and/or blocks that perform alignment of pixel values in color image 242 and pixel values in monochrome image 244. Neural network 200 could include a second set of branches and/or blocks that generate output image 216 based on representations of aligned pixel values 220-222 outputted by the first set of branches and/or blocks.

Second, input into neural network 200 can include pixel values from additional images that are captured by RGB sensor 202 and monochrome sensor 224. For example, image data 212 that is used to fuse a given color image 242 with a given monochrome image 244 could include aligned or non-aligned pixel values from color image 242 and monochrome image 244, as well as aligned or nonaligned pixel values from additional pairs of color and monochrome images of the same scene. These additional images could be included in temporal sequences of images captured by RGB sensor 202 and monochrome sensor 224 (e.g., a series of images captured in a "burst" shooting mode, a sequence of video frames, etc.). To process image data 212 for this temporal sequence of images, neural network 200 could include recurrent loops, transformer blocks, temporal blocks, and/or other components that use feature maps from one or more previous frames and/or one or more subsequent frames in the sequence to generate output image 216 for a target image in the sequence.

Third, input to neural network 200 can include pixel values from additional images that are captured by other camera sensors. For example, image data 212 could include aligned or non-aligned pixel values from images captured by RGBW sensors, infrared sensors, depth sensors, and/or other types of sensors. These additional images could be captured concurrently with color image 242 and monochrome image 244 and included in image data 212 that is inputted into neural network 200. To process image data 212 for these additional images, neural network 200 could include one or more convolutional layers, transformer blocks, attention mechanisms, and/or other components that incorporate visual details, color information, depth information, and/or other information from the additional images into output image 216.

Figure 4:
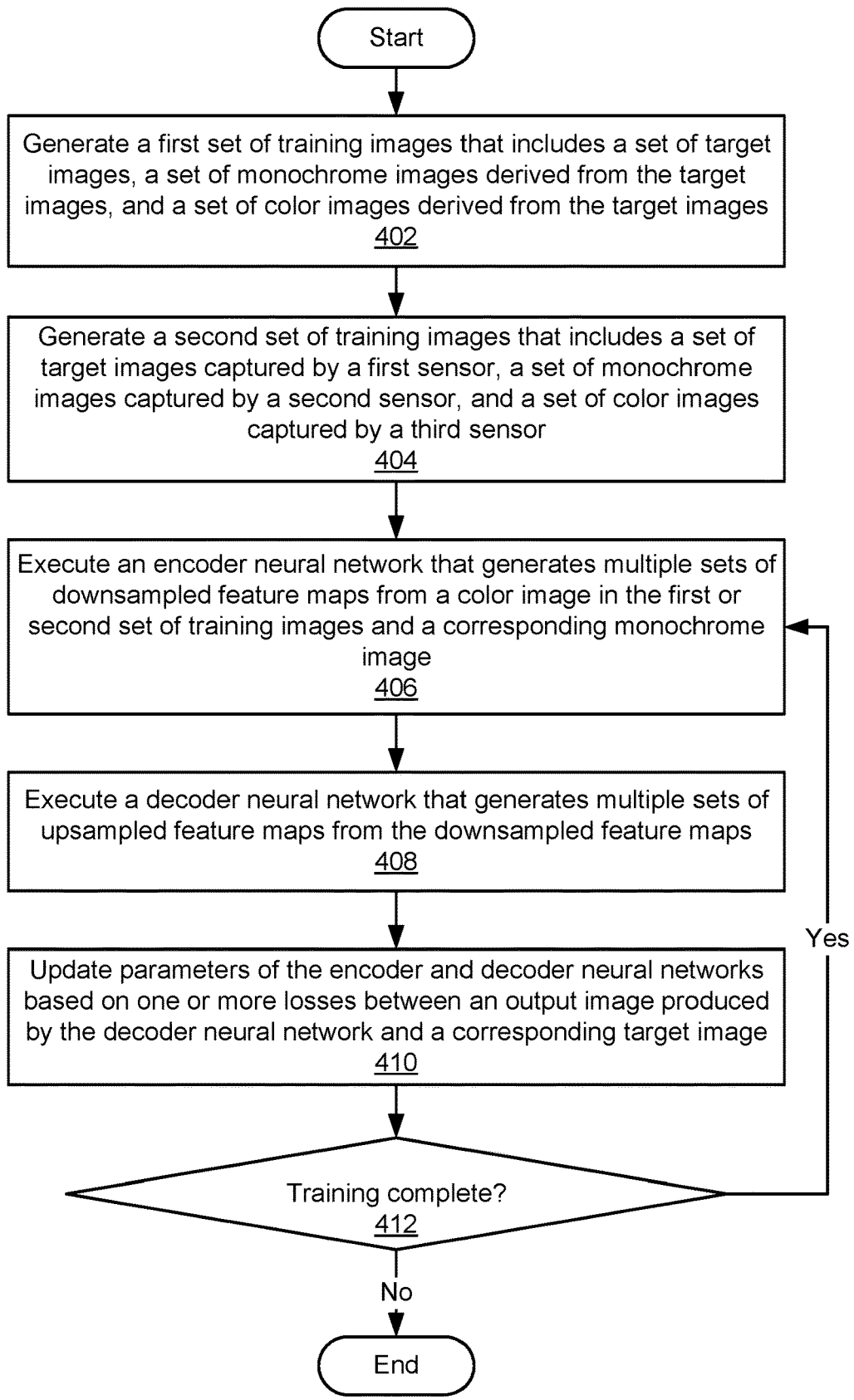
FIG. 4 is a flow diagram of method steps for training a neural network to perform fusion of monochrome and color images, according to various embodiments.

FIG. 4 is a flow diagram of method steps for training a neural network to perform fusion of monochrome and color images, according to various embodiments. Although the method steps are described in conjunction with the systems of FIGS. 1-2, persons skilled in the art will understand that any system configured to perform the method steps in any order falls within the scope of the present disclosure.

As shown, in step 402, training engine 122 generates a first set of training images that include a set of target images, a set of monochrome images derived from the target images, and a set of color images derived from the target images. For example, the target images could include high-resolution color images from one or more image datasets and/or captured by a high-resolution RGB sensor. An imaging simulation technique could be used to convert each target image into a lower-resolution monochrome image and a lower-resolution color image. This conversion could additionally be performed so that the lower-resolution color image and monochrome image are synthesized from two different viewpoints that reflect a layout of an RGB sensor and a monochrome sensor within a device or camera.

In step 404, training engine 122 generates a second set of training images that includes a set of target images captured by a first sensor, a set of monochrome images captured by a second sensor, and a set of color images captured by a third sensor. For example, a beam splitter could be used to direct one portion of light from a scene to a high-resolution RGB sensor and another portion of light from the scene to a combination of a lower-resolution RGB sensor and a monochrome sensor arranged in a certain layout. The high-resolution color sensor would capture a high-resolution target image of the scene, the lower-resolution color sensor would capture a lower resolution color image of the scene, and the monochrome sensor would capture a monochrome image of the scene at the same resolution as and/or at a higher resolution than the color image captured by the lower-resolution color sensor.

In step 406, training engine 122 executes an encoder neural network that generates multiple sets of downsampled feature maps from a color image in the first or second set of training images and a corresponding monochrome image. For example, training engine 122 could use an optical flow estimation technique, image registration technique, and/or image rectification technique to align luminance values from a monochrome image of a scene and red, green, and blue color values from a color image of the same scene. Training engine 122 could also use a series of encoder blocks in the encoder neural network to generate increasingly downsampled feature maps from the aligned luminance values and color values (and optionally additional luminance and/or color values from one or more additional images of the scene). Alternatively, training engine 122 could use the encoder blocks to generate the downsampled feature maps from luminance values in the monochrome image and color values from the color image without aligning the luminance values and color values.

In step 408, training engine 122 executes a decoder neural network that generates multiple sets of upsampled feature maps from the downsampled feature maps. For example, training engine 122 could use a series of decoder blocks in the decoder neural network to generate increasingly upsampled feature maps from some or all downsampled feature maps outputted by the encoder neural network until a target resolution is reached. Input into each decoder block could include a feature map outputted by the previous decoder block in the series and/or a downsampled feature map that is generated by a corresponding encoder block in the encoder neural network.

In step 410, training engine 122 updates parameters of the encoder and decoder neural networks based on one or more losses between an output image produced by the decoder neural network and a corresponding target image. For example, the output image could include, red, green, blue, and/or other color values for each pixel location in the monochrome image and/or a subset of pixel locations in the monochrome image. Training engine 122 could calculate an L1 loss, L2 loss, and/or another measure of error between color values in the output image and corresponding color values in the target image. If the target image has a higher resolution than the output image, training engine 122 could map pixel locations in the output image to corresponding pixel locations in the target image and compute the losses based on the mappings. Training engine 122 could also, or instead, map a given pixel location in the output image to multiple adjacent pixel locations in the target image (e.g., a 2×2 grid of pixels) and interpolate or otherwise aggregate color values for the adjacent pixel locations in the target image into a set of "representative" color values. Training engine 122 could then compute one or more losses between a set of color values for the pixel location in the output image and the set of representative color values for the corresponding adjacent pixel locations in the target image. Training engine 122 could then use gradient descent and backpropagation to update weights in the encoder and decoder neural networks in a way that reduces the loss.

In step 412, training engine 122 determines whether or not training of the neural network is complete. For example, training engine 122 could determine that training is complete when one or more conditions are met. These condition(s) include (but are not limited to) convergence in the parameters of the encoder and decoder neural networks, the lowering of a loss to below a threshold, and/or a certain number of training steps, iterations, batches, epochs, and/or stages. While training of the neural network is not complete, training engine 122 continues performing steps 402-406. Training engine 122 then ends the process of training the neural network once the condition(s) are met.

As mentioned above, training engine 122 is configured to train the neural network over two stages. During the first stage, training engine 122 could perform operations 406-410 multiple times using synthetic monochrome images, synthetic color images, and the corresponding target images from the first set of training images. After the first stage of training is complete (e.g., as determined using one or more conditions described above), training engine 122 performs a second stage of training that repeats operations 406-410 using real color images, real monochrome images, and the corresponding target images from the second set of training images. The first stage allows the neural network to learn from a large set of training images, and the second stage is used to fine-tune the performance of the neural network using a smaller set of "real world" color and monochrome images.

Figure 5:
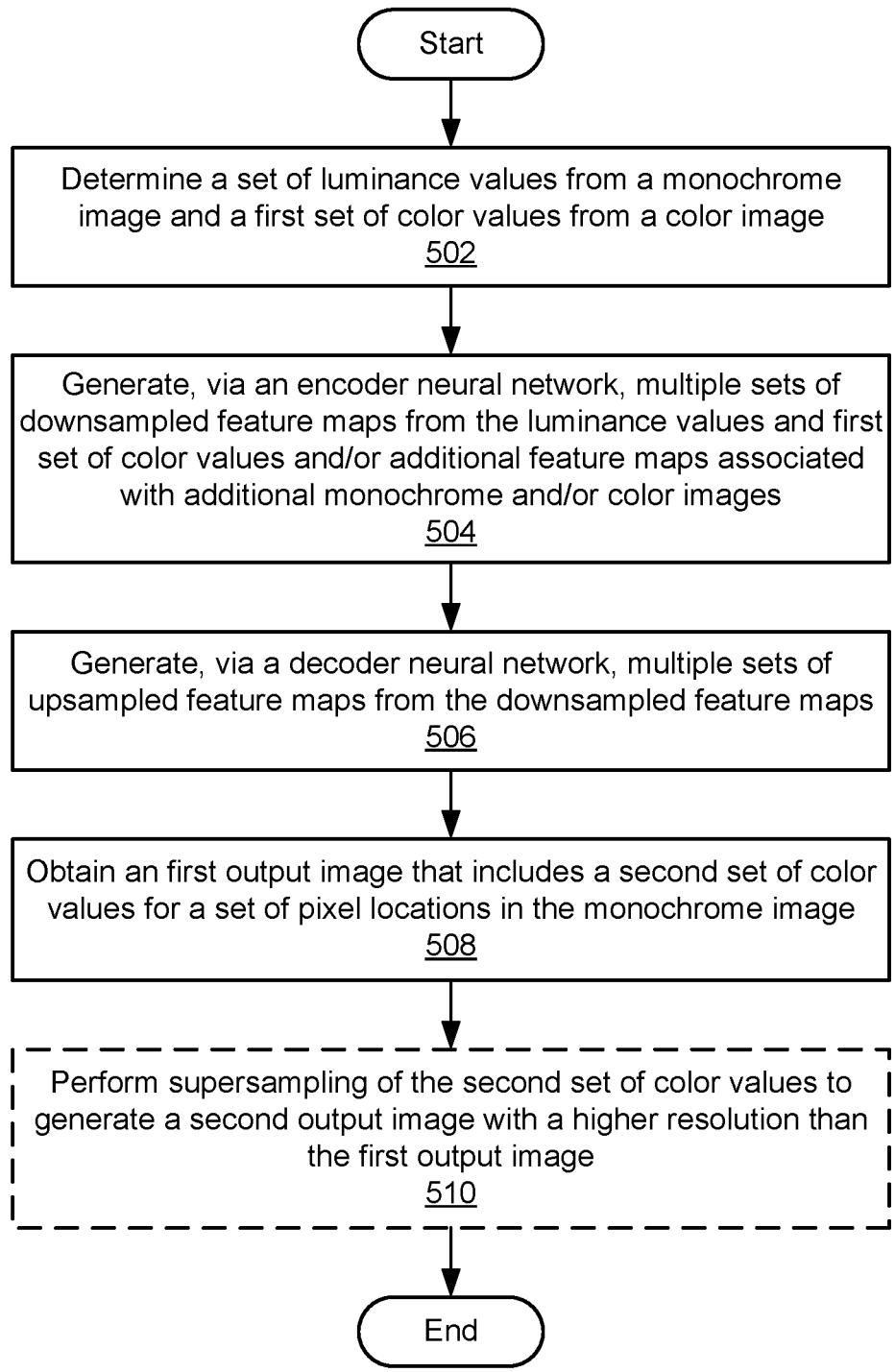
FIG. 5 is a flow diagram of method steps for performing fusion of a monochrome image and a color image, according to various embodiments.

FIG. 5 is a flow diagram of method steps for performing fusion of a monochrome image and a color image, according to various embodiments. Although the method steps are described in conjunction with the systems of FIGS. 1-2, persons skilled in the art will understand that any system configured to perform the method steps in any order falls within the scope of the present disclosure.

As shown, in step 502, execution engine 124 determines a set of luminance values from the monochrome image and a first set of color values from the color image. For example, the monochrome image could be captured by a monochrome sensor, and the color image could be captured by an RGB sensor (or another type of sensor with a color filter array). Execution engine 124 could obtain the luminance values as grayscale pixel values from the monochrome image and the first set of color values as red, green, and blue pixel values from the color image. Execution engine 124 could also use an optical flow estimation technique, image registration technique, and/or image rectification technique to align the luminance values and first set of color values, so that a given object or feature in a scene depicted in the monochrome image and the color image appears at the same location within both images.

In step 504, execution engine 124 generates, via an encoder neural network, multiple sets of downsampled feature maps from the luminance values and first set of color values and/or additional feature maps associated with additional monochrome and/or color images. For example, execution engine 124 could input the multi-channel image into a series of encoder blocks. Execution engine 124 could also input one or more feature maps generated by the encoder blocks from one or more additional images (e.g., one or more images captured by other camera sensors and/or one or more images captured at a different point in time by the monochrome sensor and/or RGB sensor) into some or all of the encoder blocks. Execution engine 124 could then use the series of encoder blocks to generate increasingly downsampled feature maps associated with the images.

In step 506, execution engine 124 generates, via a decoder neural network, multiple sets of upsampled feature maps from the downsampled feature maps. For example, execution engine 124 apply a series of decoder blocks in the decoder neural network to some or all feature maps generated by the encoder blocks in the encoder neural network to produce increasingly upsampled feature maps associated with the input image.

In step 508, execution engine 124 obtains a first output image that includes a second set of color values for a set of pixel locations in the monochrome image. For example, execution engine 124 could obtain the output image from the last layer of the decoder neural network. The output image could include three color channels that store red, green, and blue pixel values for each pixel location in the monochrome image and/or a subset of pixel locations in the monochrome image. The output image includes visual details associated with the luminance values in the monochrome image and color information provided by the first set of color values in the color image.

In step 510, execution engine 124 optionally performs supersampling of the second set of color values to generate a second output image with a higher resolution than the first output image. For example, execution engine 124 could use one or more convolutional layers, pixel shuffle layers, and/or other types of neural network layers to generate a second output image that corresponds to an increase in the resolution of the first output image by a certain factor.

Artificial Reality System

Embodiments of the disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) or near-eye display (NED) connected to a host computer system, a standalone HMD or NED, a mobile device or computing system, or any other hardware platform capable of providing artificial reality content to one or more viewers.

Figure 6:
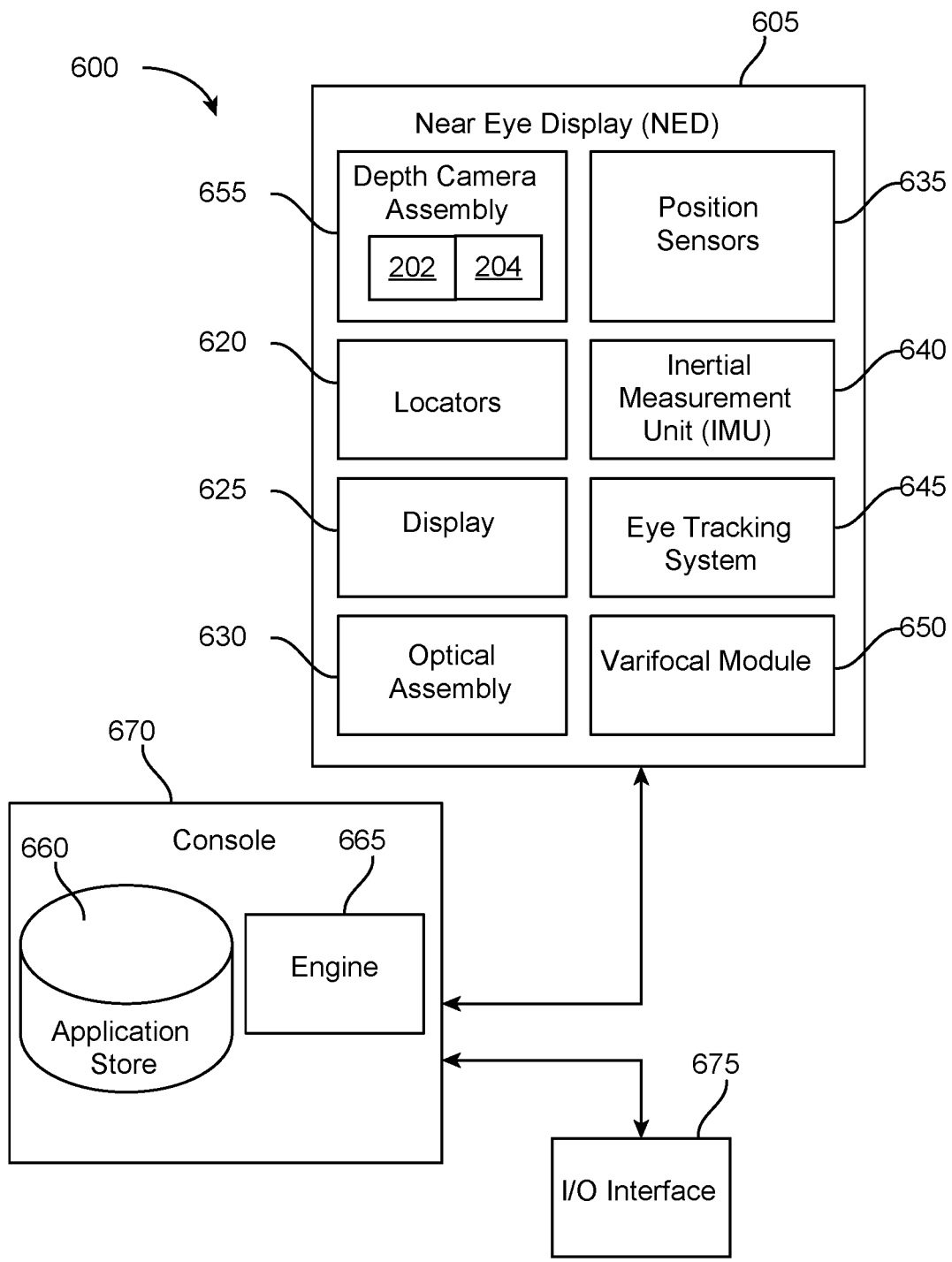
FIG. 6 is a block diagram of an embodiment of a near-eye display (NED) system in which a console operates, according to various embodiments.

FIG. 6 is a block diagram of an embodiment of a near-eye display (NED) system 600 in which a console operates, according to various embodiments. The NED system 600 may operate in a virtual reality (VR) system environment, an augmented reality (AR) system environment, a mixed reality (MR) system environment, or some combination thereof. The NED system 600 shown in FIG. 6 comprises a NED 605 and an input/output (I/O) interface 675 that is coupled to the console 670.

While FIG. 6 shows an example NED system 600 including one NED 605 and one I/O interface 675, in other embodiments any number of these components may be included in the NED system 600. For example, there may be multiple NEDs 605, and each NED 605 has an associated I/O interface 675. Each NED 605 and I/O interface 675 communicates with the console 670. In alternative configurations, different and/or additional components may be included in the NED system 600. Additionally, various components included within the NED 605, the console 670, and the I/O interface 675 may be distributed in a different manner than is described in conjunction with FIGS. 1-3B in some embodiments. For example, some or all of the functionality of the console 670 may be provided by the NED 605 and vice versa.

The NED 605 may be a head-mounted display that presents content to a user. The content may include virtual and/or augmented views of a physical, real-world environment including computer-generated elements (e.g., two-dimensional, or three-dimensional images, two-dimensional or three-dimensional video, sound, etc.). In some embodiments, the NED 605 may also present audio content to a user. The NED 605 and/or the console 670 may transmit the audio content to an external device via the I/O interface 675. The external device may include various forms of speaker systems and/or headphones. In various embodiments, the audio content is synchronized with visual content being displayed by the NED 605.

The NED 605 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other.

As shown in FIG. 6, the NED 605 may include a depth camera assembly (DCA) 655, one or more locators 620, a display 625, an optical assembly 630, one or more position sensors 635, an inertial measurement unit (IMU) 640, an eye tracking system 645, and a varifocal module 650. In some embodiments, the display 625 and the optical assembly 630 can be integrated together into a projection assembly. Various embodiments of the NED 605 may have additional, fewer, or different components than those listed above. Additionally, the functionality of each component may be partially or completely encompassed by the functionality of one or more other components in various embodiments.

The DCA 655 captures sensor data describing depth information of an area surrounding the NED 605. The sensor data may be generated by one or a combination of depth imaging techniques, such as triangulation, structured light imaging, time-of-flight imaging, stereo imaging, laser scan, and so forth. The DCA 655 can compute various depth properties of the area surrounding the NED 605 using the sensor data. Additionally, or alternatively, the DCA 655 may transmit the sensor data to the console 670 for processing. Further, in various embodiments, the DCA 655 captures or samples sensor data at different times. For example, the DCA 655 could sample sensor data at different times within a time window to obtain sensor data along a time dimension.

The DCA 655 includes an illumination source, an imaging device, and a controller. The illumination source emits light onto an area surrounding the NED 605. In an embodiment, the emitted light is structured light. The illumination source includes a plurality of emitters that each emits light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (such as edge emitters), inorganic or organic light-emitting diodes (LEDs), a vertical-cavity surface-emitting laser (VCSEL), or some other source. In some embodiments, a single emitter, or a plurality of emitters in the illumination source can emit light having a structured light pattern. The imaging device includes RGB sensor 202, monochrome sensor 224, and/or other types of camera sensors that capture ambient light in the environment surrounding NED 605, in addition to light reflected off of objects in the environment that is generated by the plurality of emitters. In various embodiments, the imaging device may be an infrared camera, or a camera configured to operate in a visible spectrum. The controller coordinates how the illumination source emits light and how the imaging device captures light. For example, the controller may determine a brightness of the emitted light. In some embodiments, the controller also analyzes detected light to detect objects in the environment and position information related to those objects.

The locators 620 are objects located in specific positions on the NED 605 relative to one another and relative to a specific reference point on the NED 605. A locator 620 may be a light emitting diode (LED), a corner cube reflector, a reflective marker, a type of light source that contrasts with an environment in which the NED 605 operates, or some combination thereof. In embodiments where the locators 620 are active (i.e., an LED or other type of light emitting device), the locators 620 may emit light in the visible band (~360 nm to 750 nm), in the infrared (IR) band (~750 nm to 7700 nm), in the ultraviolet band (70 nm to 360 nm), some other portion of the electromagnetic spectrum, or some combination thereof.

In some embodiments, the locators 620 are located beneath an outer surface of the NED 605, which is transparent to the wavelengths of light emitted or reflected by the locators 620 or is thin enough not to substantially attenuate the wavelengths of light emitted or reflected by the locators 620. Additionally, in some embodiments, the outer surface or other portions of the NED 605 are opaque in the visible band of wavelengths of light. Thus, the locators 620 may emit light in the IR band under an outer surface that is transparent in the IR band but opaque in the visible band.

The display 625 displays two-dimensional or three-dimensional images to the user in accordance with pixel data received from the console 670 and/or one or more other sources. In various embodiments, the display 625 comprises a single display or multiple displays (e.g., separate displays for each eye of a user). In some embodiments, the display 625 comprises a single or multiple waveguide displays. Light can be coupled into the single or multiple waveguide displays via, e.g., a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a laser-based display, one or more waveguides, other types of displays, a scanner, a one-dimensional array, and so forth. In addition, combinations of the display types may be incorporated in display 625 and used separately, in parallel, and/or in combination.

The optical assembly 630 magnifies image light received from the display 625, corrects optical errors associated with the image light, and presents the corrected image light to a user of the NED 605. The optical assembly 630 includes a plurality of optical elements. For example, one or more of the following optical elements may be included in the optical assembly 630: an aperture, a Fresnel lens, a convex lens, a concave lens, a filter, a reflecting surface, or any other suitable optical element that deflects, reflects, refracts, and/or in some way alters image light. Moreover, the optical assembly 630 may include combinations of different optical elements. In some embodiments, one or more of the optical elements in the optical assembly 630 may have one or more coatings, such as partially reflective or antireflective coatings.

In some embodiments, the optical assembly 630 may be designed to correct one or more types of optical errors. Examples of optical errors include barrel or pincushion distortions, longitudinal chromatic aberrations, or transverse chromatic aberrations. Other types of optical errors may further include spherical aberrations, chromatic aberrations, or errors due to the lens field curvature, astigmatisms, in addition to other types of optical errors. In some embodiments, visual content transmitted to the display 625 is pre-distorted, and the optical assembly 630 corrects the distortion as image light from the display 625 passes through various optical elements of the optical assembly 630. In some embodiments, optical elements of the optical assembly 630 are integrated into the display 625 as a projection assembly that includes at least one waveguide coupled with one or more optical elements.

The IMU 640 is an electronic device that generates data indicating a position of the NED 605 based on measurement signals received from one or more of the position sensors 635 and from depth information received from the DCA 655. In some embodiments of the NED 605, the IMU 640 may be a dedicated hardware component. In other embodiments, the IMU 640 may be a software component implemented in one or more processors.

In operation, a position sensor 635 generates one or more measurement signals in response to a motion of the NED 605. Examples of position sensors 635 include: one or more accelerometers, one or more gyroscopes, one or more magnetometers, one or more altimeters, one or more inclinometers, and/or various types of sensors for motion detection, drift detection, and/or error detection. The position sensors 635 may be located external to the IMU 640, internal to the IMU 640, or some combination thereof.

Based on the one or more measurement signals from one or more position sensors 635, the IMU 640 generates data indicating an estimated current position of the NED 605 relative to an initial position of the NED 605. For example, the position sensors 635 include multiple accelerometers to measure translational motion (forward/back, up/down, left/right) and multiple gyroscopes to measure rotational motion (e.g., pitch, yaw, and roll). In some embodiments, the IMU 640 rapidly samples the measurement signals and calculates the estimated current position of the NED 605 from the sampled data. For example, the IMU 640 integrates the measurement signals received from the accelerometers over time to estimate a velocity vector and integrates the velocity vector over time to determine an estimated current position of a reference point on the NED 605. Alternatively, the IMU 640 provides the sampled measurement signals to the console 670, which analyzes the sample data to determine one or more measurement errors. The console 670 may further transmit one or more of control signals and/or measurement errors to the IMU 640 to configure the IMU 640 to correct and/or reduce one or more measurement errors (e.g., drift errors). The reference point is a point that may be used to describe the position of the NED 605. The reference point may generally be defined as a point in space, or a position related to a position and/or orientation of the NED 605.

In various embodiments, the IMU 640 receives one or more parameters from the console 670. The one or more parameters are used to maintain tracking of the NED 605. Based on a received parameter, the IMU 640 may adjust one or more IMU parameters (e.g., a sample rate). In some embodiments, certain parameters cause the IMU 640 to update an initial position of the reference point so that it corresponds to a next position of the reference point. Updating the initial position of the reference point as the next calibrated position of the reference point helps reduce drift errors in detecting a current position estimate of the IMU 640.

In various embodiments, the eye tracking system 645 is integrated into the NED 605. The eye tracking system 645 may comprise one or more illumination sources (e.g., infrared illumination source, visible light illumination source) and one or more imaging devices (e.g., one or more cameras). In operation, the eye tracking system 645 generates and analyzes tracking data related to a user's eyes as the user wears the NED 605. In various embodiments, the eye tracking system 645 estimates the angular orientation of the user's eye. The orientation of the eye corresponds to the direction of the user's gaze within the NED 605. The orientation of the user's eye is defined herein as the direction of the foveal axis, which is the axis between the fovea (an area on the retina of the eye with the highest concentration of photoreceptors) and the center of the eye's pupil. In general, when a user's eyes are fixed on a point, the foveal axes of the user's eyes intersect that point. The pupillary axis is another axis of the eye that is defined as the axis passing through the center of the pupil and that is perpendicular to the corneal surface. The pupillary axis does not, in general, directly align with the foveal axis. Both axes intersect at the center of the pupil, but the orientation of the foveal axis is offset from the pupillary axis by approximately −1° to 6° laterally and ±4° vertically.

Because the foveal axis is defined according to the fovea, which is located in the back of the eye, the foveal axis can be difficult or impossible to detect directly in some eye tracking embodiments. Accordingly, in some embodiments, the orientation of the pupillary axis is detected, and the foveal axis is estimated based on the detected pupillary axis.

In general, movement of an eye corresponds not only to an angular rotation of the eye, but also to a translation of the eye, a change in the torsion of the eye, and/or a change in shape of the eye. The eye tracking system 645 may also detect translation of the eye, i.e., a change in the position of the eye relative to the eye socket. In some embodiments, the translation of the eye is not detected directly, but is approximated based on a mapping from a detected angular orientation. Translation of the eye corresponding to a change in the eye's position relative to the detection components of the eye tracking unit may also be detected. Translation of this type may occur, for example, due to a shift in the position of the NED 605 on a user's head. The eye tracking system 645 may also detect the torsion of the eye, i.e., rotation of the eye about the pupillary axis. The eye tracking system 645 may use the detected torsion of the eye to estimate the orientation of the foveal axis from the pupillary axis. The eye tracking system 645 may also track a change in the shape of the eye, which may be approximated as a skew or scaling linear transform or a twisting distortion (e.g., due to torsional deformation). The eye tracking system 645 may estimate the foveal axis based on some combination of the angular orientation of the pupillary axis, the translation of the eye, the torsion of the eye, and the current shape of the eye.

As the orientation may be determined for both eyes of the user, the eye tracking system 645 is able to determine where the user is looking. The NED 605 can use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other function that is based in part on the orientation of at least one of the user's eyes, or some combination thereof. Determining a direction of a user's gaze may include determining a point of convergence based on the determined orientations of the user's left and right eyes. A point of convergence may be the point that the two foveal axes of the user's eyes intersect (or the nearest point between the two axes). The direction of the user's gaze may be the direction of a line through the point of convergence and through the point halfway between the pupils of the user's eyes.

In some embodiments, the varifocal module 650 is integrated into the NED 605. The varifocal module 650 may be communicatively coupled to the eye tracking system 645 in order to enable the varifocal module 650 to receive eye tracking information from the eye tracking system 645. The varifocal module 650 may further modify the focus of image light emitted from the display 625 based on the eye tracking information received from the eye tracking system 645. Accordingly, the varifocal module 650 can reduce vergence-accommodation conflict that may be produced as the user's eyes resolve the image light. In various embodiments, the varifocal module 650 can be interfaced (e.g., either mechanically or electrically) with at least one optical element of the optical assembly 630.

In operation, the varifocal module 650 may adjust the position and/or orientation of one or more optical elements in the optical assembly 630 in order to adjust the focus of image light propagating through the optical assembly 630. In various embodiments, the varifocal module 650 may use eye tracking information obtained from the eye tracking system 645 to determine how to adjust one or more optical elements in the optical assembly 630. In some embodiments, the varifocal module 650 may perform foveated rendering of the image light based on the eye tracking information obtained from the eye tracking system 645 in order to adjust the resolution of the image light emitted by the display 625. In this case, the varifocal module 650 configures the display 625 to display a high pixel density in a foveal region of the user's eye-gaze and a low pixel density in other regions of the user's eye-gaze.

The I/O interface 675 facilitates the transfer of action requests from a user to the console 670. In addition, the I/O interface 675 facilitates the transfer of device feedback from the console 670 to the user. An action request is a request to perform a particular action. For example, an action request may be an instruction to start or end capture of image or video data or an instruction to perform a particular action within an application, such as pausing video playback, increasing, or decreasing the volume of audio playback, and so forth. In various embodiments, the I/O interface 675 may include one or more input devices. Example input devices include: a keyboard, a mouse, a game controller, a joystick, and/or any other suitable device for receiving action requests and communicating the action requests to the console 670. In some embodiments, the I/O interface 675 includes an IMU 640 that captures calibration data indicating an estimated current position of the I/O interface 675 relative to an initial position of the I/O interface 675.

In operation, the I/O interface 675 receives action requests from the user and transmits those action requests to the console 670. Responsive to receiving the action request, the console 670 performs a corresponding action. For example, responsive to receiving an action request, console 670 may configure I/O interface 675 to emit haptic feedback onto an arm of the user. For example, console 670 may configure I/O interface 675 to deliver haptic feedback to a user when an action request is received. Additionally, or alternatively, the console 670 may configure the I/O interface 675 to generate haptic feedback when the console 670 performs an action, responsive to receiving an action request.

The console 670 provides content to the NED 605 for processing in accordance with information received from one or more of: the DCA 655, the eye tracking system 645, one or more other components of the NED 605, and the I/O interface 675. In the embodiment shown in FIG. 6, the console 670 includes an application store 660 and an engine 665. In some embodiments, the console 670 may have additional, fewer, or different modules and/or components than those described in conjunction with FIG. 6. Similarly, the functions further described below may be distributed among components of the console 670 in a different manner than described in conjunction with FIG. 6.

The application store 660 stores one or more applications for execution by the console 670. An application is a group of instructions that, when executed by a processor, performs a particular set of functions, such as generating content for presentation to the user. For example, an application may generate content in response to receiving inputs from a user (e.g., via movement of the NED 605 as the user moves his/her head, via the I/O interface 675, etc.). Examples of applications include gaming applications, conferencing applications, video playback applications, or other suitable applications.

In some embodiments, the engine 665 generates a three-dimensional mapping of the area surrounding the NED 605 (i.e., the "local area") based on information received from the NED 605. In some embodiments, the engine 665 determines depth information for the three-dimensional mapping of the local area based on depth data received from the NED 605. In various embodiments, the engine 665 uses depth data received from the NED 605 to update a model of the local area and to generate and/or modify media content based in part on the updated model of the local area.

The engine 665 also executes applications within the NED system 600 and receives position information, acceleration information, velocity information, predicted future positions, or some combination thereof, of the NED 605. Based on the received information, the engine 665 determines various forms of media content to transmit to the NED 605 for presentation to the user. For example, if the received information indicates that the user has looked to the left, the engine 665 generates media content for the NED 605 that mirrors the user's movement in a virtual environment or in an environment augmenting the local area with additional media content. Accordingly, the engine 665 may generate and/or modify media content (e.g., visual and/or audio content) for presentation to the user. The engine 665 may further transmit the media content to the NED 605. Additionally, in response to receiving an action request from the I/O interface 675, the engine 665 may perform an action within an application executing on the console 670. The engine 665 may further provide feedback when the action is performed. For example, the engine 665 may configure the NED 605 to generate visual and/or audio feedback and/or the I/O interface 675 to generate haptic feedback to the user.

In some embodiments, based on the eye tracking information (e.g., orientation of the user's eye) received from the eye tracking system 645, the engine 665 determines a resolution of the media content provided to the NED 605 for presentation to the user on the display 625. The engine 665 may adjust a resolution of the visual content provided to the NED 605 by configuring the display 625 to perform foveated rendering of the visual content, based at least in part on a direction of the user's gaze received from the eye tracking system 645. The engine 665 provides the content to the NED 605 having a high resolution on the display 625 in a foveal region of the user's gaze and a low resolution in other regions, thereby reducing the power consumption of the NED 605. In addition, using foveated rendering reduces a number of computing cycles used in rendering visual content without compromising the quality of the user's visual experience. In some embodiments, the engine 665 can further use the eye tracking information to adjust a focus of the image light emitted from the display 625 in order to reduce vergence-accommodation conflicts.

Figure 7A:
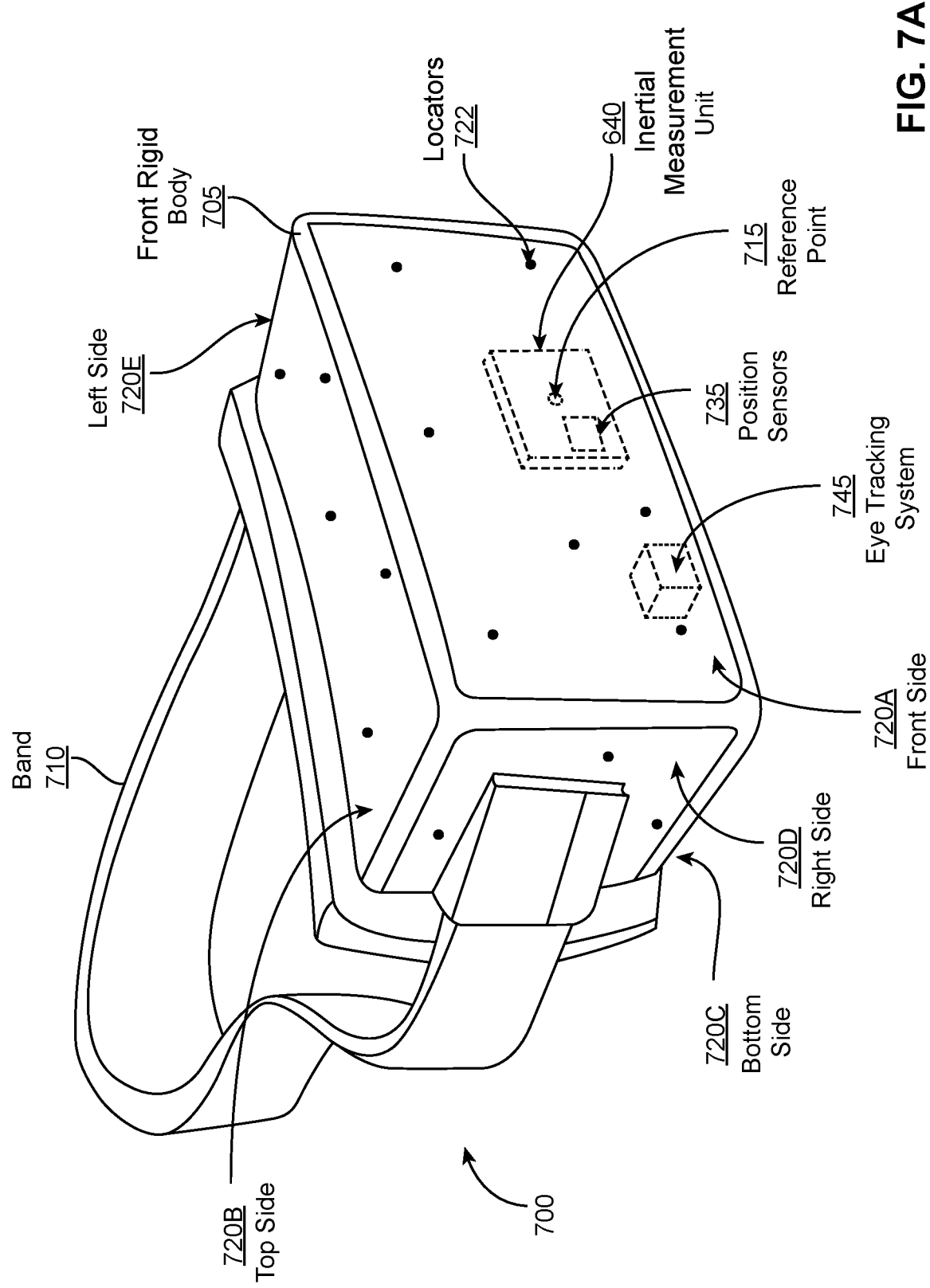
FIG. 7A is a diagram of an NED, according to various embodiments.

FIG. 7A is a diagram of an NED 700, according to various embodiments. In various embodiments, NED 700 presents media to a user. The media may include visual, auditory, and haptic content. In some embodiments, NED 700 provides artificial reality (e.g., virtual reality) content by providing a real-world environment and/or computer-generated content. In some embodiments, the computer-generated content may include visual, auditory, and haptic information. The NED 700 is an embodiment of the NED 605 and includes a front rigid body 705 and a band 710. The front rigid body 705 includes an electronic display element of the electronic display 625 (not shown in FIG. 7A), the optical assembly 630 (not shown in FIG. 7A), the IMU 640, the one or more position sensors 735, the eye tracking system 745, and the locators 722. In the embodiment shown by FIG. 7A, the position sensors 735 are located within the IMU 640, and neither the IMU 640 nor the position sensors 735 are visible to the user.

The locators 722 are located in fixed positions on the front rigid body 705 relative to one another and relative to a reference point 715. In the example of FIG. 7A, the reference point 715 is located at the center of the IMU 640. Each of the locators 722 emits light that is detectable by the imaging device in the DCA 655. The locators 722, or portions of the locators 722, are located on a front side 720A, a top side 720B, a bottom side 720C, a right side 720D, and a left side 720E of the front rigid body 705 in the example of FIG. 7A.

The NED 700 includes the eye tracking system 745. As discussed above, the eye tracking system 745 may include a structured light generator that projects an interferometric structured light pattern onto the user's eye and a camera to detect the illuminated portion of the eye. The structured light generator and the camera may be located off the axis of the user's gaze. In various embodiments, the eye tracking system 745 may include, additionally or alternatively, one or more time-of-flight sensors and/or one or more stereo depth sensors. In FIG. 7A, the eye tracking system 745 is located below the axis of the user's gaze, although the eye tracking system 745 can alternately be placed elsewhere. Also, in some embodiments, there is at least one eye tracking unit for the left eye of the user and at least one tracking unit for the right eye of the user.

In various embodiments, the eye tracking system 745 includes one or more cameras on the inside of the NED 700. The camera(s) of the eye tracking system 745 may be directed inwards, toward one or both eyes of the user while the user is wearing the NED 700, so that the camera(s) may image the eye(s) and eye region(s) of the user wearing the NED 700. The camera(s) may be located off the axis of the user's gaze. In some embodiments, the eye tracking system 745 includes separate cameras for the left eye and the right eye (e.g., one or more cameras directed toward the left eye of the user and, separately, one or more cameras directed toward the right eye of the user).

Figure 7B:
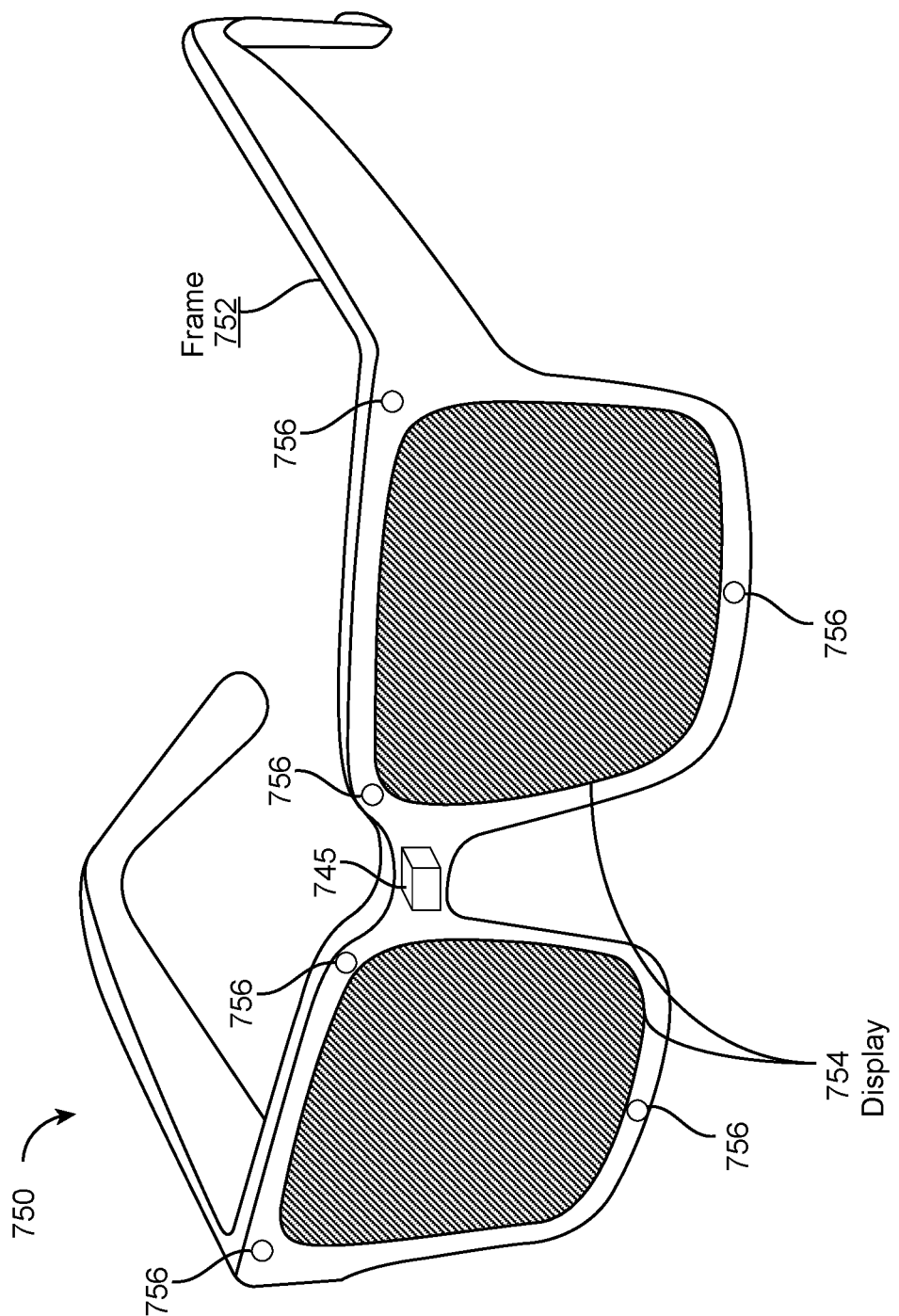
FIG. 7B is another diagram of an NED, according to various embodiments.

FIG. 7B is a diagram of an NED 750, according to various embodiments. In various embodiments, NED 750 presents media to a user. The media may include visual, auditory, and haptic content. In some embodiments, NED 750 provides artificial reality (e.g., augmented reality) content by providing a real-world environment and/or computer-generated content. In some embodiments, the computer-generated content may include visual, auditory, and haptic information. The NED 750 is an embodiment of the NED 605.

NED 750 includes frame 752 and display 754. In various embodiments, the NED 750 may include one or more additional elements. Display 754 may be positioned at different locations on the NED 750 than the locations illustrated in FIG. 7B. Display 754 is configured to provide content to the user, including audiovisual content. In some embodiments, one or more displays 754 may be located within frame 752.

NED 750 further includes eye tracking system 745 and one or more corresponding modules 756. The modules 756 may include emitters (e.g., light emitters) and/or sensors (e.g., image sensors, cameras). In various embodiments, the modules 756 are arranged at various positions along the inner surface of the frame 752, so that the modules 756 are facing the eyes of a user wearing the NED 750. For example, the modules 756 could include emitters that emit structured light patterns onto the eyes and image sensors to capture images of the structured light pattern on the eyes. As another example, the modules 756 could include multiple time-of-flight sensors for directing light at the eyes and measuring the time of travel of the light at each pixel of the sensors. As a further example, the modules 756 could include multiple stereo depth sensors for capturing images of the eyes from different vantage points. In various embodiments, the modules 756 also include image sensors for capturing 2D images of the eyes.

In sum, the disclosed techniques use a deep neural network to perform fusion of monochrome and color images. A monochrome image of a scene is received from a monochrome sensor with transparent filter elements disposed over a first set of photosites. A color image of the same scene is received from a color sensor with red, green, blue, or other color filter elements disposed over a second set of photosites. An optical flow estimation technique, image registration technique, and/or image rectification technique is used to align pixel values of the monochrome image and the color image, and the aligned pixel values for both images are inputted into the deep neural network. The deep neural network includes a U-Net architecture with an encoder and a decoder. The encoder includes a series of encoder blocks that gradually downsample feature maps associated with the input, and the decoder includes a series of decoder blocks that gradually upsample feature maps associated with the input. The last layer of the decoder generates an output image that includes polychromatic (e.g., red, green and blue) pixel values for each pixel location in the monochrome image.

One technical advantage of the disclosed techniques relative to the prior art is that the output image combines visual details captured by the monochrome sensor with color information captured by the color sensor. Accordingly, the disclosed techniques provide better low light performance and image quality than conventional techniques that generate color images using only color sensors with the same pixel size. Another technical advantage of the disclosed techniques is the incorporation of visual details and/or color from additional images into the output image, which further improves low light performance and image quality. These technical advantages provide one or more technological improvements over prior art approaches.

1. In some embodiments, a computer-implemented method for combining a color image and a monochrome image comprises inputting a first set of pixel values from the color image and a second set of pixel values from the monochrome image into a neural network; applying, via a first set of neural network layers included in the neural network, one or more downsampling operations and one or more upsampling operations to feature maps associated with the first set of pixel values and the second set of pixel values to generate a first output image, wherein the first output image includes a first set of color values for a first set of pixel locations in the monochrome image; and applying a second set of neural network layers included in the neural network to the first set of color values to generate a second output image that includes a second set of color values, wherein the second set of color values is larger than the first set of color values.

2. The computer-implemented method of clause 1, further comprising applying the neural network to additional feature maps associated with one or more additional images to produce the first output image.

3. The computer-implemented method of any of clauses 1-2, wherein the one or more additional images comprise an additional color image and an additional monochrome image.

4. The computer-implemented method of any of clauses 1-3, further comprising determining at least one of the first set of pixel values or the second set of pixel values based on an alignment of the color image and the monochrome image.

5. The computer-implemented method of any of clauses 1-4, further comprising synthesizing the color image and the monochrome image based on a first target image; and training the neural network based on one or more losses between the second output image and the first target image.

6. The computer-implemented method of any of clauses 1-5, further comprising applying the neural network to a third set of pixel values captured by a monochrome sensor and a fourth set of pixel values captured by a first RGB sensor to generate a third output image; and training the neural network based on one or more additional losses between the third output image and a second target image captured by a second RGB sensor.

7. The computer-implemented method of any of clauses 1-6, wherein the one or more losses comprise an L1 loss between the second set of color values and a third set of color values from the first target image.

8. The computer-implemented method of any of clauses 1-7, wherein the second set of neural network layers comprises at least one of a convolutional layer or a pixel shuffle layer.

9. The computer-implemented method of any of clauses 1-8, wherein the second output image is associated with a higher resolution than the first output image.

10. The computer-implemented method of any of clauses 1-9, wherein the neural network includes a U-Net architecture.

11. In some embodiments, one or more non-transitory computer-readable media store instructions that, when executed by one or more processors, cause the one or more processors to perform the steps of inputting a first set of pixel values from a color image and a second set of pixel values from a monochrome image into a neural network; applying, via a first set of neural network layers included in the neural network, one or more downsampling operations and one or more upsampling operations to feature maps associated with the first set of pixel values and the second set of pixel values to generate a first output image, wherein the first output image includes a first set of color values for a first set of pixel locations in the monochrome image; and applying a second set of neural network layers included in the neural network to the first set of color values to generate a second output image that includes a second set of color values, wherein the second set of color values is larger than the first set of color values.

12. The one or more non-transitory computer-readable media of clause 11, wherein the instructions further cause the one or more processors to perform the step of applying the neural network to additional feature maps associated with one or more additional images to produce the first output image.

13. The one or more non-transitory computer-readable media of any of clauses 11-12, wherein the one or more additional images comprise an additional color image that temporally precedes the color image and an additional monochrome image that temporally precedes the monochrome image.

14. The one or more non-transitory computer-readable media of any of clauses 11-13, wherein the color image is captured by a first sensor, the monochrome image is captured by a second sensor, and the one or more additional images are captured by a third sensor.

15. The one or more non-transitory computer-readable media of any of clauses 11-14, wherein the instructions further cause the one or more processors to perform the steps of applying the neural network to a third set of pixel values captured by a monochrome sensor and a fourth set of pixel values captured by a first RGB sensor to generate a third output image; and training the neural network based on one or more losses between the third output image and a first target image captured by a second RGB sensor.

16. The one or more non-transitory computer-readable media of any of clauses 11-15, wherein the instructions further cause the one or more processors to perform the steps of synthesizing the color image and the monochrome image based on a second target image; and training the neural network based on one or more additional losses between the second output image and the second target image.

17. The one or more non-transitory computer-readable media of any of clauses 11-16, wherein the second RGB sensor is associated with a higher resolution than the first RGB sensor.

18. The one or more non-transitory computer-readable media of any of clauses 11-17, wherein the second set of neural network layers comprises at least one of a convolutional layer and a pixel shuffle layer.

19. The one or more non-transitory computer-readable media of any of clauses 11-18, wherein the first set of neural network layers comprises an encoder that performs the one or more downsampling operations and a decoder that performs the one or more upsampling operations.

20. In some embodiments, a wearable device comprises a monochrome sensor; an RGB sensor; one or more memories that store instructions, and one or more processors that are coupled to the one or more memories and, when executing the instructions, are configured to determine, based on an alignment of a color image captured by the RGB sensor and a monochrome image captured by the monochrome sensor, a first set of pixel values from the color image and a second set of pixel values from the monochrome image; apply, via a first set of neural network layers, one or more downsampling operations and one or more upsampling operations to feature maps associated with the first set of pixel values and the second set of pixel values to generate a first output image, wherein the first output image includes a first set of color values for a first set of pixel locations in the monochrome image; and apply a second set of neural network layers to the first set of color values to generate a second output image that includes a second set of color values, wherein the second set of color values is larger than the first set of color values.

Any and all combinations of any of the claim elements recited in any of the claims and/or any elements described in this application, in any fashion, fall within the contemplated scope of the present invention and protection.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for combining a color image and a monochrome image, the method comprising:
   inputting a first set of pixel values from the color image and a second set of pixel values from the monochrome image into a neural network;
   applying, via a first set of neural network layers included in the neural network, one or more downsampling operations and one or more upsampling operations to feature maps associated with the first set of pixel values, the second set of pixel values, and a third set of pixel values to generate a first output image, wherein the first output image includes a first set of color values for a first set of pixel locations in the monochrome image, wherein the first set of pixel values, second set of pixel values, and third set of pixel values are captured by a respective first sensor, second sensor, and third sensor, wherein each set of pixel values are taken of a same scene and at a similar time; and
   applying a second set of neural network layers included in the neural network to the first set of color values to generate a second output image that includes a second set of color values, wherein the second set of color values is larger than the first set of color values.

2. The computer-implemented method of claim 1, wherein the third sensor is a red green blue (RGB) sensor.

3. The computer-implemented method of claim 1, further comprising determining at least one of the first set of pixel values or the second set of pixel values based on an alignment of the color image and the monochrome image.

4. The computer-implemented method of claim 1, further comprising:
   synthesizing the color image and the monochrome image based on a first target image; and
   training the neural network based on one or more losses between the second output image and the first target image.

5. The computer-implemented method of claim 4, further comprising:
   applying the neural network to a fourth set of pixel values captured by a monochrome sensor and a fifth set of pixel values captured by an RGB sensor to generate a third output image; and
   training the neural network based on one or more additional losses between the third output image and a second target image captured by an additional RGB sensor.

6. The computer-implemented method of claim 4, wherein the one or more losses comprise an L1 loss between the second set of color values and a third set of color values from the first target image.

7. The computer-implemented method of claim 1, wherein the second set of neural network layers comprises at least one of a convolutional layer or a pixel shuffle layer.

8. The computer-implemented method of claim 1, wherein the second output image is associated with a higher resolution than the first output image.

9. The computer-implemented method of claim 1, wherein the neural network includes a U-Net architecture.

10. One or more non-transitory computer-readable media storing instructions that, when executed by one or more processors, cause the one or more processors to perform the steps of:
    inputting a first set of pixel values from a color image and a second set of pixel values from a monochrome image into a neural network;
    applying, via a first set of neural network layers included in the neural network, one or more downsampling operations and one or more upsampling operations to feature maps associated with the first set of pixel values, the second set of pixel values, and a third set of pixel values, to generate a first output image, wherein the first output image includes a first set of color values for a first set of pixel locations in the monochrome image; and
    applying a second set of neural network layers included in the neural network to the first set of color values to generate a second output image that includes a second set of color values, wherein the second set of color values is larger than the first set of color values, wherein the first set of pixel values, second set of pixel values, and third set of pixel values are captured by a respective first sensor, second sensor, and third sensor, wherein each set of pixel values are captured of a same scene and at a similar time.

11. The one or more non-transitory computer-readable media of claim 10, wherein the instructions further cause the one or more processors to perform the step of applying the neural network to additional feature maps associated with one or more additional images to produce the first output image.

12. The one or more non-transitory computer-readable media of claim 11, wherein the one or more additional images comprise an additional color image that temporally precedes the color image and an additional monochrome image that temporally precedes the monochrome image.

13. The one or more non-transitory computer-readable media of claim 10, wherein the instructions further cause the one or more processors to perform the steps of:
applying the neural network to a fourth set of pixel values captured by a monochrome sensor and a fifth set of pixel values captured by an RGB sensor to generate a third output image; and
training the neural network based on one or more losses between the third output image and a first target image captured by an additional RGB sensor.

14. The one or more non-transitory computer-readable media of claim 13, wherein the instructions further cause the one or more processors to perform the steps of:
synthesizing the color image and the monochrome image based on a second target image; and
training the neural network based on one or more additional losses between the second output image and the second target image.

15. The one or more non-transitory computer-readable media of claim 13, wherein the additional RGB sensor is associated with a higher resolution than the RGB sensor.

16. The one or more non-transitory computer-readable media of claim 10, wherein the second set of neural network layers comprises at least one of a convolutional layer and a pixel shuffle layer.

17. The one or more non-transitory computer-readable media of claim 10, wherein the third sensor is an RGB sensor.

18. A wearable device, comprising:
a monochrome sensor;
an RGB sensor;
one or more memories that store instructions, and
one or more processors that are coupled to the one or more memories and, when executing the instructions, are configured to:
determine, based on an alignment of a color image captured by the RGB sensor and a monochrome image captured by the monochrome sensor, a first set of pixel values from the color image and a second set of pixel values from the monochrome image;
apply, via a first set of neural network layers, one or more downsampling operations and one or more upsampling operations to feature maps associated with the first set of pixel values, the second set of pixel values, and a third set of pixel values, to generate a first output image, wherein the first output image includes a first set of color values for a first set of pixel locations in the monochrome image; and
apply a second set of neural network layers to the first set of color values to generate a second output image that includes a second set of color values, wherein the second set of color values is larger than the first set of color values, wherein the third set of pixel values is captured by a second RGB sensor and wherein each set of pixel values are taken of a same scene and at a similar time.

* * * * *